Nov. 29, 1938.  J. BOUCHER  2,138,135
PIPE JOINT
Filed May 9, 1935  3 Sheets-Sheet 1
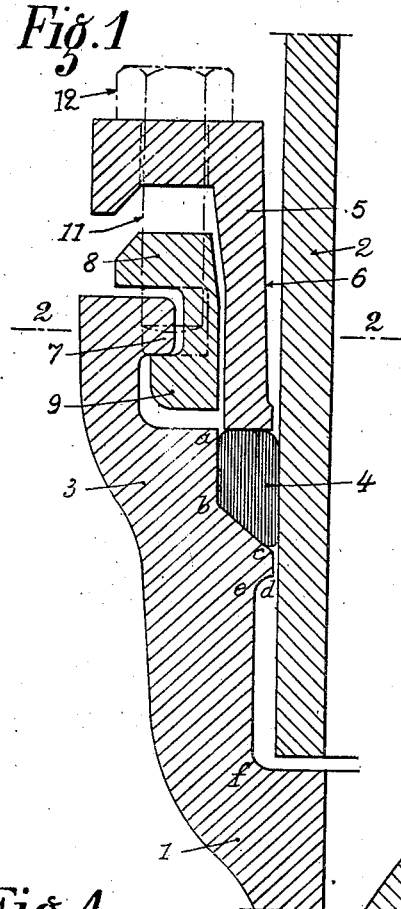
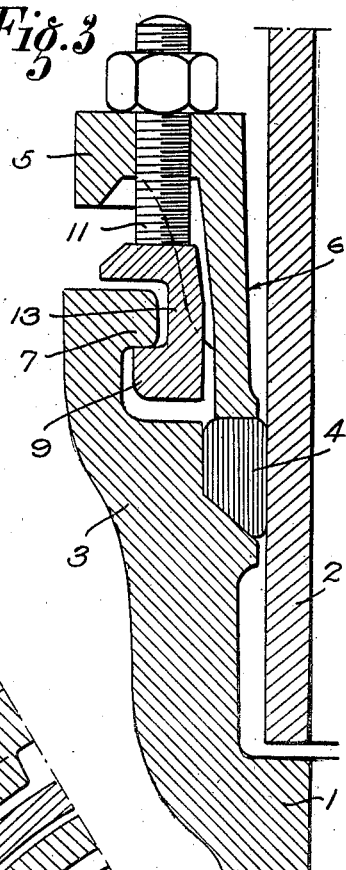
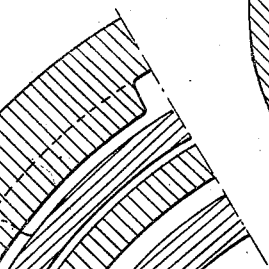
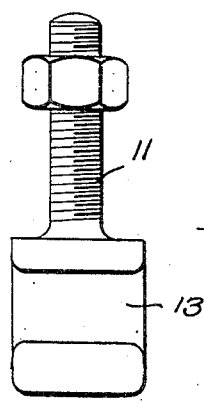
Jacques Boucher
INVENTOR
his Atty.

Nov. 29, 1938.  J. BOUCHER  2,138,135
PIPE JOINT
Filed May 9, 1935  3 Sheets-Sheet 2
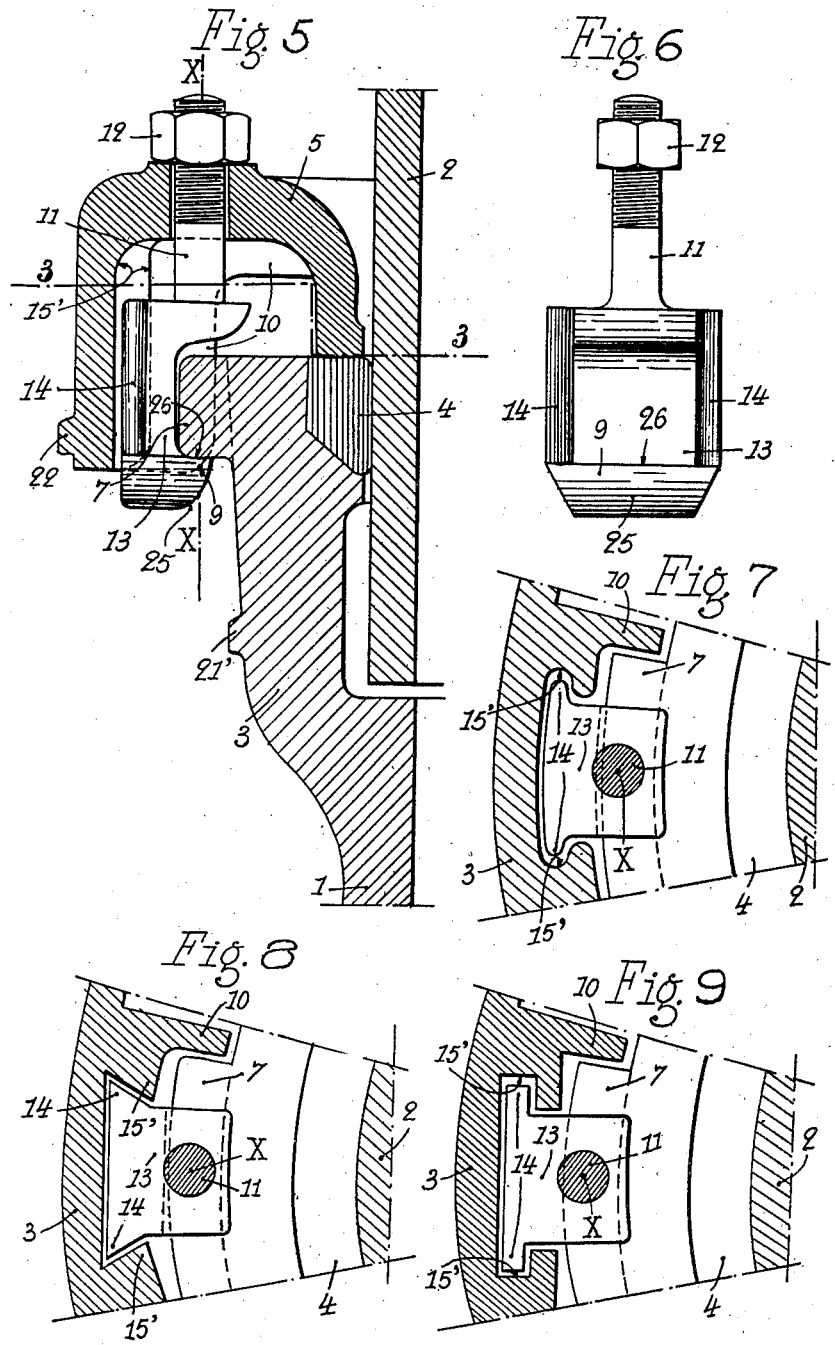

Nov. 29, 1938.                J. BOUCHER                2,138,135
                              PIPE JOINT
                          Filed May 9, 1933              3 Sheets-Sheet 3
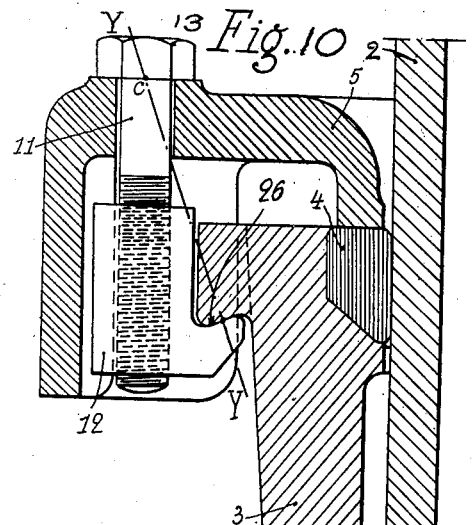
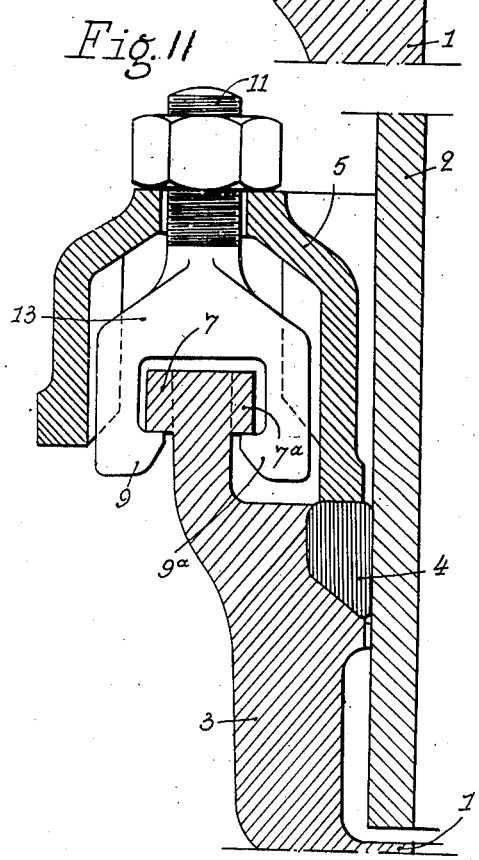
Jacques Boucher
INVENTOR
his ATTY.

UNITED STATES PATENT OFFICE 2,138,135

PIPE JOINT

Jacques Boucher, Boulogne-sur-Seine, France, assignor to Société Anonyme des Hauts Fourneaux et Fonderies de Pont-a-Mousson, Pont-a-Mousson, France Application May 9, 1935, Serial No. 20,595
In Belgium May 25, 1934

1 Claim. (Cl. 285—135)

There is frequently used, for the assembling of pipes, a method which consists in inserting the plain end of each pipe into the enlarged end or bell of the adjacent pipe, and a non-leaking joint is obtained by means of a packing ring of india-rubber or like yielding material which is inserted in the annular space between the interior of the enlarged end of one pipe and the plain end of the other pipe, this ring being compressed by means of a suitable device termed the pressing gland.

One object of the present invention is a device for the assembling of pipes, which is of a simple construction, may be rapidly mounted, and is absolutely non-leaking in spite of all distortions. The said device is chiefly characterized by the fact that the pressing of the said gland is effected by means of screw devices which bear directly or indirectly, by a joint of the bayonet type, upon lugs provided on the inner or outer surface of the enlarged end of one of the two pipes to be assembled.

According to one embodiment, the device comprises, in combination: a gland which is mounted by means of a bayonet-like joint upon lugs provided on the inner or outer part of the enlarged portions of the pipe; and screws, bolts or studs provided with nuts bearing upon the gland and holding the same against the packing ring.

A further feature resides in a construction wherein the gland is pressed by means of bolts and nuts, the heads of the bolts, or nuts, having a suitable form and bearing directly against the inner part of the enlarged end, by means of a bayonet-like joint.

A still further feature resides in the provision of screws for tightening the gland, which screws are screwed to a certain number of anchoring members which bear upon lugs provided in the interior of the enlarged end.

These and other features of the invention will be better understood with reference to the accompanying drawings, which are given solely by way of example, and wherein:

Fig. 1 is a partial lengthwise section, on the line I—I of Fig. 2, of an assembling device in conformity with the invention; in this Fig. 1, the dot-and-dash lines correspond to a section on the line I'—I' of Fig. 2.

Fig. 2 is a horizontal section on the line 2—2 of Fig. 1.

Fig. 3 is a section of a modification, in which the heads of the pressing bolts engage the lugs on the bell.

Fig. 4 is a front view of one of the said bolts.

Fig. 5 is a partial lengthwise section of an assembling device in conformity with the invention, in which the heads of the bolts bear upon the outer part of the enlarged end.

Fig. 6 is a front view of one of the said bolts.

Fig. 7 is a partial cross-section of the device, in which the gland is sectioned on the line 3—3 of Fig. 5.

Figs. 8 and 9 are partial cross-sections, of like nature, of other modifications.

Figs. 10 and 11 are lengthwise sections of other modifications.

In the embodiments herein represented, the assembling device is adapted for the tight connection of two pipes 1 and 2. The pipe I has a bell 3, into which the spigot pipe 2 is inserted.

Between the end of the spigot pipe 2 and the bell 3, is mounted a packing ring 4 ensuring a non-leaking joint. The ring 4 is pressed in place by means of a gland 5.

The ring 4 consists of india rubber or of a plastic substance. Its seating recess, abc, may have different outlines, according to the shape of the ring which it contains, whether square, rectangular, trapezoidal, rounded, or of a combined form.

The lower part of the enlarged end comprises a recess def, and the inner face 6 of the gland 5 has a considerable taper.

In the example of execution represented in Figs. 1 and 2, an anchoring ring 8 is secured in the interior of the bell 3 of the pipe I by means of a bayonet like joint. For this purpose, the bell 3 and the anchoring ring 8 are provided with an equal number of radially projecting spaced lugs 7 for the bell, and 9 for the anchoring ring.

In order to secure this latter member, the lugs 9 are engaged between the lugs 7 and the anchoring ring is rotated. This rotation is limited by the stops 10 (Fig. 2) cast in one with the face of the anchoring member 8, thus providing for ready alignment of the corresponding lugs.

Into the anchoring ring 8 are screwed the screws II whose heads 12 bear upon the gland 5, whereby the said screws are subject to tension.

The stems of the screws II engage in the empty space in the edge of the joint which is located between two lugs 9.

In the modification represented in Fig. 3 the bolts II serve both as connecting means and as pressure devices, owing to the U shape of the cross-section of the head 13 (Figs. 3 and 4).

In the embodiment represented in Figs. 5 to 9, the anchoring members are screwed up by bolts and nuts 12; the heads of the bolts 13 are provided with hooking ends 9 which bear upon lugs 7 formed on the outer part of the bell 3, the number of such lugs being equal to the number of bolts.

All of the hooking ends are engaged at the same time under the corresponding lugs, by means of a bayonet-like joint. During this fitting operation, the rotation of the gland is limited by the lug 7 against which are brought the bosses 10 provided on the gland.

The assembling of the joint is facilitated by a matching arrangement comprising, on the one hand, suitable matching parts 21' provided on the outer part of the bell 3, which remains visible after the assembling of the joint, and on the other hand, suitable matching parts 22 provided on the visible outer part of the gland. The said matching parts have respectively, with reference to the lugs 7 and the bolts 11, such positions that their coincidence corresponds either to the position of the insertion, or to the position of the tightening of the joint. Different matching parts corresponding to each of the two above-mentioned positions may also be used simultaneously.

Obviously, each matching arrangement may comprise either a single matching part or several matching parts having like positions relatively to the bolts 11 or the lugs 7. The said matching parts may be painted or engraved, or may be cast integrally, or may be specially formed by any other means. They may also consist of details of the members having a suitable form, for instance the position of the bolts on the gland, or the trade-mark on the bell.

The heads 13 of the bolts 11 are provided with longitudinal ribs 14 which are freely slidable in grooves 15' provided in the gland, thus preventing the rotation of the bolts, chiefly when the gland is inserted and when the joint is tightened up.

The ribs and grooves forming the said guiding device may have a rounded shape, as represented in Fig. 7, or may have a trapezoidal shape, as shown in Fig. 8, or a T shape, as represented in Fig. 9, or any equivalent shape.

The heads of the said bolts have at their ends a bevelled part 25 (Figs. 5 and 6) which facilitates the mounting, upon the said bell, of the gland provided with the bolts.

Fig. 10 represents a modification in which the special head of the bolts used in the preceding case is replaced by a nut of similar shape 12, and herein the head 13 of the bolt 11, will bear upon the gland 5.

In the modifications above described, the surface of contact 26 between the hooking ends 9 and the ribs 7 may be perpendicular to the axis of the piping, as shown in Fig. 5. In this case, the axis X—X of the stems of the bolts may pass through the centre of this surface.

This arrangement permits the avoidance when tightening the joint, of all kinds of transverse stresses having a tendency to release the said hooking ends, and it also has the effect of reducing the stress on the gland.

In the said modifications, a like result may be obtained by giving to the contact surface 26 a direction which is inclined from the axis of the piping, as represented in Fig. 10, this being such, for instance, that the line Y—Y perpendicular to this surface, will pass through the centre C of the surface of contact between the gland 5 and the head 13 of the bolt or nut.

This last mentioned arrangement will permit, on the other hand, the unscrewing and releasing of a single bolt or nut without unscrewing the whole of the joint. This advantage is particularly important for the upkeep of the pipe lines in service.

The modification represented in Fig. 11 differs from the ones represented in Figs. 5 to 10, only by the fact that the bolts 11 have a head 13 of U shape, provided with hooking parts 9 and 9a adapted to bear against shoulders 7 and 7a formed on the exterior and in the interior of the bell 3.

Having now described my invention what I claim as new and desire to secure by Letters Patent is:

In a bell and spigot pipe joint having a compressible packing ring between the bell and the spigot and a gland including an annular flange, means to press the gland with said annular flange against the packing ring, said means comprising spaced radial lugs on the bell, circumferentially spaced bolts extending through said gland, anchoring members on said bolts guided in said gland for axial movement and having radially projecting lugs which positively engage said lugs on the bell when the gland is rotated, and means on said gland to prevent rotation of said anchoring member in any axial position thereof.

JACQUES BOUCHER.